No. 636,966. Patented Nov. 14, 1899.
E. ERICSON.
BICYCLE BELL.
(Application filed Aug. 17, 1899.)
(No Model.)
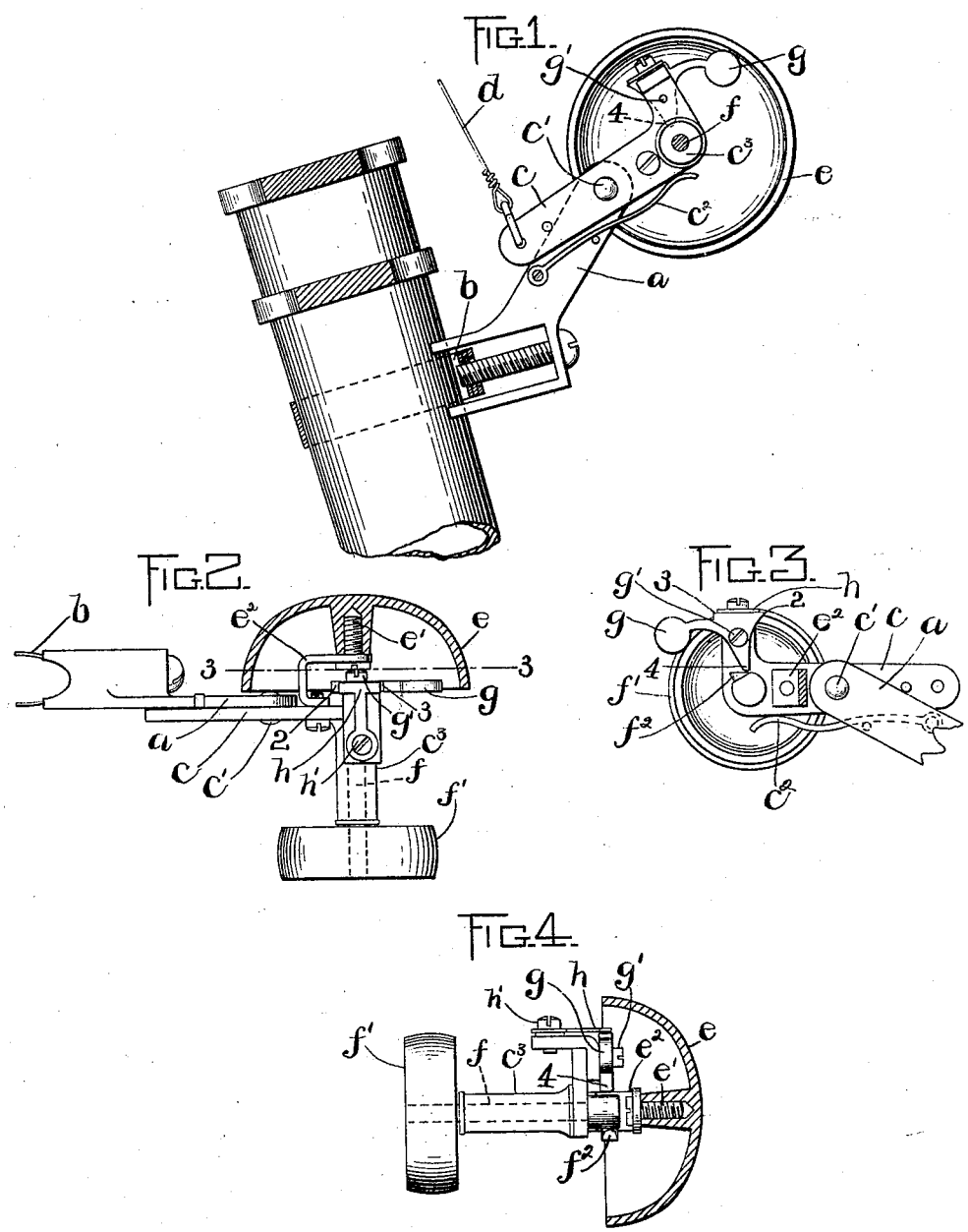
WITNESSES:
E. Batchelder
H. L. Robbins
INVENTOR:
Edward Ericson
By Might Brown & Quinby
Attys

UNITED STATES PATENT OFFICE.

EDWARD ERICSON, OF BOSTON, MASSACHUSETTS.

BICYCLE-BELL.

SPECIFICATION forming part of Letters Patent No. 636,966, dated November 14, 1899.

Application filed August 17, 1899. Serial No. 727,478. (No model.)

*To all whom it may concern:*

Be it known that I, EDWARD ERICSON, of Boston, in the county of Suffolk and State of Massachusetts, have invented certain new and useful Improvements in Bicycle-Bells, of which the following is a specification.

This invention relates to bells for bicycles and other vehicles of the kind operated by contact with the tire of the vehicle.

The invention has for its object to provide a simple, durable, and compact bell; and to this end it consists in certain novel features of construction and arrangement hereinafter described and claimed.

Of the accompanying drawings, Figure 1 represents a side elevation, partly in section, showing a bicycle-bell constructed in accordance with my invention. Fig. 2 represents a plan view thereof, partly in section. Fig. 3 represents a section on the line 3 3 of Fig. 2. Fig. 4 represents an end elevation, partly in section.

The same reference characters indicate the same parts in all the figures.

Referring to the drawings, $a$ designates a bracket provided at one end with a frame-clamp $b$, which affords a means for securing the device to the front fork or other convenient part of the bicycle-frame in proximity to one of the wheel-tires. At the other end is a stud $c'$, on which is pivoted an arm $c$, carrying the gong $e$ and tire-engaging roller $f'$. The latter is attached to the end of a shaft $f$, journaled in a bearing-sleeve $c^3$, which projects laterally from one end of the arm $c$. A spring $c^2$, attached to the bracket $a$ and bearing against the arm $c$, normally elevates the outer end of the latter and holds the roller $f'$ out of contact with the wheel-tire. The arm is rocked to produce contact of the roller with the tire by means of a cord $d$ or other suitable operating device attached to the rear end of the arm.

The gong $e$ is attached by a screw $e'$ to an arm or lug $e^2$, offset from the rocker-arm $c$, and is sounded by means of a striker $g$, pivoted at $g'$ to the arm $c$ and engaged once in each revolution of the shaft $f$ by a cam projection or stud $f^2$, mounted on the inner end of said shaft. Said projection engages a toe 4, formed on the striker $g$, and turns the latter on its pivot away from the gong against the tension of a flat spring $h$, which is secured at one end by a screw $h'$ to the arm $c$. The hub of the striker is formed, as shown, with a flat surface, against which the free end of the spring $h$ bears, said surface terminating in two abutments or cams 2 and 3, located on opposite sides of the pivot $g'$. The end of the spring is made sufficiently wide to cover both of these abutments, as shown, and as a consequence of this construction the abutment 2 lifts the spring when the projection $f^2$ rotates the striker, and as soon as the said projection releases the striker the latter flies back toward and past its normal position and strikes the gong $e$, the abutment 2 rebounding against the spring $h$. In its normal position, as seen in Fig. 1, the head of the striker is slightly removed from contact with the gong, the spring $h$ then bearing equally on both abutments 2 3.

When operative connection with the wheel is produced by depressing the arm $c$ until the roller $f'$ bears on the tire, said roller is rapidly revolved and a quick succession of strokes is imparted to the gong, as will be readily understood.

It will be perceived from the above description that the number of parts in my improved bell is reduced to a minimum, and their construction and arrangement produce a compact and durable device, the novel spring and striker device being simple and positive in its action and little liable to breakage or derangement.

I claim—

A bicycle-bell comprising a frame-bracket, an arm pivotally mounted thereon and having a bearing for a shaft, a shaft journaled in said bearing and having a tire-engaging roll and a striker-actuating projection, a striker pivoted to the arm and having two cam-abutments located on opposite sides of its pivot and a toe adapted to be engaged by said projection on the shaft, a spring fixed to the said arm and having an end portion extended to cover both of said cam-abutments, and a gong carried by the arm and adapted to be sounded by said striker.

In testimony whereof I have affixed my signature in presence of two witnesses.

EDWARD ERICSON.

Witnesses:
C. F. BROWN,
E. BATCHELDER.